United States Patent
Zhang et al.

(10) Patent No.: US 10,548,157 B2
(45) Date of Patent: Jan. 28, 2020

(54) UNLICENSED SPECTRUM SCHEDULING METHOD AND DEVICE, AND USER EQUIPMENT UE

(71) Applicant: HUAWEI TECHNOLOGIES CO., LTD., Shenzhen (CN)

(72) Inventors: Jian Zhang, Shanghai (CN); Qinghai Zeng, Shanghai (CN); Jing Liu, Shanghai (CN); Qufang Huang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 158 days.

(21) Appl. No.: 15/338,953

(22) Filed: Oct. 31, 2016

(65) Prior Publication Data

US 2017/0048879 A1 Feb. 16, 2017

Related U.S. Application Data

(63) Continuation of application No. PCT/CN2014/076622, filed on Apr. 30, 2014.

(51) Int. Cl.
*H04W 76/27* (2018.01)
*H04W 72/12* (2009.01)
(Continued)

(52) U.S. Cl.
CPC ..... *H04W 72/1215* (2013.01); *H04W 52/146* (2013.01); *H04W 72/048* (2013.01); *H04W 72/0453* (2013.01); *H04W 76/27* (2018.02)

(58) Field of Classification Search
CPC ...... H04W 72/04; H04W 88/08; H04W 76/00
See application file for complete search history.

(56) References Cited

U.S. PATENT DOCUMENTS

| 2012/0320832 A1* | 12/2012 | Kim ..................... H04L 1/0026 370/328 |
| 2014/0341207 A1* | 11/2014 | Bhushan ........... H04W 28/0289 370/350 |
| 2015/0222400 A1* | 8/2015 | Xiong ................... H04L 1/0026 370/329 |

FOREIGN PATENT DOCUMENTS

| CN | 101453260 | 6/2009 |
| CN | 101631325 | 1/2010 |

(Continued)

OTHER PUBLICATIONS

International Search Report, dated Jan. 28, 2015, in International Application No. PCT/CN2014/076622 (4 pp.).

(Continued)

*Primary Examiner* — Hassan A Phillips
*Assistant Examiner* — Prenell P Jones
(74) *Attorney, Agent, or Firm* — Slater Matsil, LLP

(57) ABSTRACT

Embodiments of the present invention provide an unlicensed spectrum scheduling method which includes: monitoring, by a scheduling device, a status of a channel, and if determining by means of monitoring that the channel is idle, sending a control frame on the channel so as to reserve the channel, where a frequency domain resource occupied by the channel is in an unlicensed spectrum; sending, by the scheduling device, first channel status information to user equipment UE, where the first channel status information indicates that the scheduling device has reserved the channel; and receiving, by the scheduling device, second channel status information fed back by the UE, and determining, according to the second channel status information, whether to schedule the UE, where the second channel status information is generated by the UE according to the channel status obtained by means of monitoring.

16 Claims, 6 Drawing Sheets

(51) Int. Cl.
*H04W 52/14* (2009.01)
*H04W 72/04* (2009.01)

(56) References Cited

FOREIGN PATENT DOCUMENTS

| | | |
|---|---|---|
| CN | 102026299 | 4/2011 |
| CN | 102387602 A | 3/2012 |
| WO | WO2012088052 | 6/2012 |
| WO | WO2013185835 | 12/2013 |
| WO | 2014/035415 A1 | 3/2014 |

OTHER PUBLICATIONS

Extended European Search Report, dated Mar. 16, 2017, in European Application No. 14890499.8 (8 pp.).
European Office Action dated Feb. 27, 2018, in corresponding European Patent Application No. 14890499.8, 5 pgs.
International Search Report dated Jan. 28, 2015 in corresponding International Application No. PCT/CN2014/076622.
Chinese Office Action dated Aug. 13, 2018 in corresponding Chinese Patent Application No. 201480001016.2, 8 pgs.

\* cited by examiner

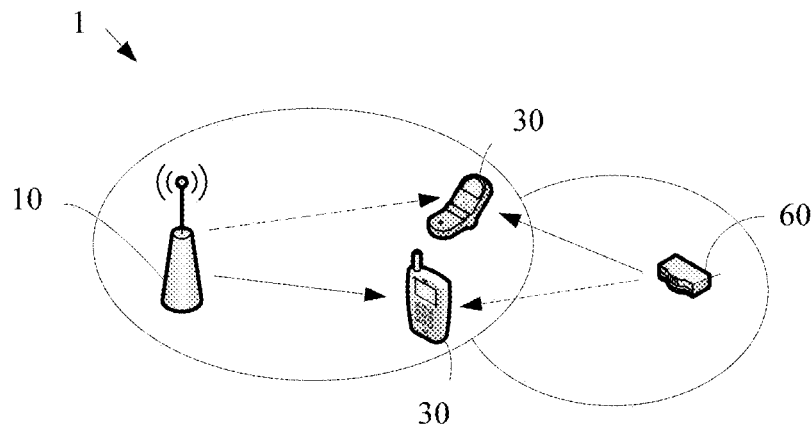

FIG. 1

| A scheduling device monitors a channel, and if determining by means of monitoring that the channel is idle, sends a control frame on the channel so as to reserve the channel | S101 |

↓

| The scheduling device sends first channel status information to UE, where the first channel status information indicates that the scheduling device has reserved the channel | S102 |

↓

| The scheduling device receives second channel status information fed back by the UE, and determines, according to the second channel status information, whether to schedule the UE | S103 |

FIG. 2

UNLICENSED SPECTRUM SCHEDULING METHOD AND DEVICE, AND USER EQUIPMENT UE

CROSS-REFERENCE TO RELATED APPLICATIONS

This application is a continuation of International Application No. PCT/CN2014/076622, filed on Apr. 30, 2014, the disclosure of which is hereby incorporated by reference in its entirety.

TECHNICAL FIELD

Embodiments of the present invention relate to the field of communications technologies, and in particular, to an unlicensed spectrum scheduling method and device, and user equipment UE.

BACKGROUND

With rapid development of a packet service and an intelligent terminal, a service of a high speed and a large data volume imposes an increasing demand for a spectrum. According to a newly issued FCC international spectrum white paper, unlicensed spectrum resources are more than licensed spectrum resources. Therefore, data transmission by using an unlicensed spectrum resource becomes a development trend.

An unlicensed spectrum includes frequency bands used for industrial, scientific and medical (Industrial, scientific and medical, ISM) devices and the like. In the prior art, a main technology used in an ISM frequency band is Wireless Fidelity (Wireless Fidelity, WiFi), a wireless local area network (wireless local network, WLAN), Bluetooth, Zig-Bee, or the like. For WiFi, quality of service (quality of service, QoS) is poor, efficiency in aspects such as multi-user scheduling is low, and a mobility management function is limited. Therefore, a Long Term Evolution (Long Term Evolution, LTE) system in the $3^{rd}$ Generation Partnership Project (the $3^{rd}$ Generation Partnership Project, 3GPP) is applied to an unlicensed spectrum, so that unlicensed spectrum resources can be more efficiently utilized and available spectrum bandwidth of an LTE user can be expanded.

An unlicensed spectrum is shared by many users, and the users may belong to different radio access technologies (radio access technology, RAT), such as LTE, WiFi, and Bluetooth. In LTE, WiFi, Bluetooth, and the like, it needs to detect whether the unlicensed spectrum is occupied by another device. Therefore, before performing transmission, an LTE, a WiFi, or a Bluetooth device or the like that uses the unlicensed spectrum needs to listen to whether the spectrum is idle, that is, needs to support "listen before talk (Listen before Talk, LBT)", so as to avoid interfering with another user who is using the unlicensed spectrum. Moreover, a maximum occupation time for a user that obtains the unlicensed spectrum is also correspondingly specified. The user needs to release the unlicensed spectrum after using for a specific time and starts to contend for the unlicensed spectrum again after waiting for a specific time. Therefore, each user is given a fair opportunity to contend for and use the unlicensed spectrum. When a channel is about to become idle or is idle, each device may perform reservation so as to determine which device can use an idle unlicensed spectrum. However, in the prior art, LTE does not support LBT or channel reservation; consequently, an LTE system cannot legally or properly share an unlicensed spectrum with another device or another system. Therefore, enabling LTE to support LBT, reserve a channel, and schedule UE on the reserved channel becomes a problem in urgent need of resolving.

SUMMARY

Embodiments of the present invention provide an unlicensed spectrum scheduling method and device, and user equipment UE, so that LTE may support LBT, a channel may be reserved, and UE may be scheduled on the reserved channel, thereby ensuring that an LTE system shares an unlicensed spectrum with another device or another system.

According to a first aspect of the present invention, an unlicensed spectrum scheduling method is provided, including:

monitoring, by a scheduling device, a status of a channel, and if determining by means of monitoring that the channel is idle, sending a control frame on the channel so as to reserve the channel, where a frequency domain resource occupied by the channel is in an unlicensed spectrum, and the scheduling device is an evolved NodeB eNB and/or a remote radio head RRH;

sending, by the scheduling device, first channel status information to user equipment UE, where the first channel status information indicates that the scheduling device has reserved the channel; and receiving, by the scheduling device, second channel status information fed back by the UE, and determining, according to the second channel status information, whether to schedule the UE, where the second channel status information is generated by the UE according to the channel status obtained by means of monitoring.

With reference to the first aspect, in a first possible implementation manner, before the receiving, by the scheduling device, second channel status information fed back by the UE, the method further includes:

sending, by the scheduling device, a radio resource control connection reconfiguration message to the UE, where the radio resource control connection reconfiguration message includes parameter information and a feedback manner of the second channel status information, and the parameter information is information that is determined by the scheduling device and used by the UE to sense the channel;

or the radio resource control connection reconfiguration message includes the parameter information, a feedback manner of the second channel status information, first reservation information, and second reservation information, the first reservation information is information indicating that the scheduling device determines, according to the channel status obtained by means of monitoring, that the UE needs to reserve the channel, and the second reservation information is information indicating that the scheduling device determines that the UE reserves the channel by using a CTS frame or an RTS frame.

With reference to the first possible implementation manner, in a second possible implementation manner, the scheduling device is an eNB; and before the sending a control frame on the channel so as to reserve the channel, the method further includes:

determining, by the eNB, a maximum power required for sending a CTS frame or an RTS frame by the UE, where the second reservation information indicates information about the maximum power. With reference to the first aspect, the first possible implementation manner, and the second possible implementation manner, in a third possible implementation manner, the RTS frame or the CTS frame further includes a field that indicates a radio access technology to which the control frame belongs, and the field is used to indicate that the channel is occupied by the radio access technology.

According to a second aspect of the present invention, an unlicensed spectrum scheduling method is provided, including:

monitoring, by user equipment UE, a status of a channel, and generating second channel status information according to the channel status obtained by means of monitoring;

receiving, by the UE, first channel status information sent by the scheduling device, where the first channel status information indicates that the scheduling device has reserved the channel, a frequency domain resource occupied by the channel is in an unlicensed spectrum, and the scheduling device is an evolved NodeB eNB and/or a remote radio head RRH; and feeding back, by the UE, the second channel status information to the scheduling device, so that the scheduling device determines, according to the second channel status information, whether to schedule the UE.

With reference to the second aspect, in a first possible implementation manner, before the receiving, by the UE, first channel status information sent by the scheduling device, the method further includes:

receiving, by the UE, a radio resource control connection reconfiguration message sent by the scheduling device, where the radio resource control connection reconfiguration message includes parameter information and a feedback manner of the second channel status information, and the parameter information is information that is determined by the scheduling device and used by the UE to sense the channel;

or the radio resource control connection reconfiguration message includes the parameter information, a feedback manner of the second channel status information, first reservation information, and second reservation information, the first reservation information is information indicating that the scheduling device determines, according to the channel status obtained by means of monitoring, that the UE needs to reserve the channel, and the second reservation information is information indicating that the scheduling device determines that the UE reserves the channel by using a CTS frame or an RTS frame.

With reference to the first possible implementation manner, in a second possible implementation manner, before the receiving, by the user equipment UE, first channel status information sent by the scheduling device, the method further includes:

the scheduling device is an eNB; and before the sending a control frame on the channel so as to reserve the channel, the method further includes:

determining, by the eNB, a maximum power required for sending a CTS frame or an RTS frame by the UE, where the second reservation information indicates information about the maximum power. With reference to the second aspect, the first possible implementation manner, and the second possible implementation manner, in a third possible implementation manner, after the receiving, by the UE, a radio resource control connection reconfiguration message sent by the eNB, the method further includes:

sending, by the UE and on the channel that is reserved by the scheduling device and indicated by the first channel status information, a control frame by using a power that is less than the maximum power, so as to reserve the channel, where the control frame is a request to send RTS frame or a clear to send CTS frame.

With reference to the second aspect, the first possible implementation manner, the second possible implementation manner, and the third possible implementation manner, in a fourth possible implementation manner, the RTS frame or the CTS frame further includes a field that indicates a radio access technology to which the control frame belongs, and the field is used to indicate that the channel is occupied by the radio access technology.

According to a third aspect of the present invention, an unlicensed spectrum scheduling device is provided, where the scheduling device is an evolved NodeB eNB and/or a remote radio head RRH, including:

a monitoring unit, configured to monitor a status of a channel;

a processing unit, configured to: if determining by means of monitoring that the channel is idle, enable a sending unit to send a control frame on the channel so as to reserve the channel, where a frequency domain resource occupied by the channel is in an unlicensed spectrum;

the sending unit, further configured to send first channel status information to user equipment UE, where the first channel status information indicates that the scheduling device has reserved the channel; and a receiving unit, configured to receive second channel status information fed back by the UE, and enable a scheduling unit to determine, according to the second channel status information, whether to schedule the UE, where the second channel status information is generated by the UE according to the channel status obtained by means of monitoring.

With reference to the third aspect, in a first possible implementation manner, before the scheduling device receives the second channel status information fed back by the UE, the scheduling device further includes:

the sending unit is further configured to send a radio resource control connection reconfiguration message to the UE, where the radio resource control connection reconfiguration message includes parameter information and a feedback manner of the second channel status information, and the parameter information is information that is determined by the scheduling device and used by the UE to sense the channel;

or the radio resource control connection reconfiguration message includes the parameter information, a feedback manner of the second channel status information, first reservation information, and second reservation information, the first reservation information is information indicating that the scheduling device determines, according to the channel status obtained by means of monitoring, that the UE needs to reserve the channel, and the second reservation information is information indicating that the scheduling device determines that the UE reserves the channel by using a CTS frame or an RTS frame.

With reference to the first possible implementation manner, in a second possible implementation manner, the scheduling device is an eNB, and the eNB further includes:

a power determining unit, configured to determine a maximum power required for sending a CTS frame or an RTS frame by the UE, where the second reservation information indicates information about the maximum power.

With reference to the third aspect, the first possible implementation manner, and the second possible implementation manner, in a third possible implementation manner, the RTS frame or the CTS frame further includes a field that indicates a radio access technology to which the control frame belongs, and the field is used to indicate that the channel is occupied by the radio access technology.

According to a fourth aspect of the present invention, unlicensed spectrum user equipment UE is provided, including:

a monitoring unit, configured to monitor a status of a channel, and enable a generating unit to generate second channel status information according to the channel status obtained by means of monitoring;

a receiving unit, configured to receive first channel status information sent by the scheduling device, where the first channel status information indicates that the scheduling device has reserved the channel, a frequency domain resource occupied by the channel is in an unlicensed spectrum, and the scheduling device is an evolved NodeB eNB and/or a remote radio head RRH; and a sending unit, configured to feed back the second channel status information to the scheduling device, so that the scheduling device determines, according to the second channel status information, whether to schedule the UE.

With reference to the fourth aspect, in a first possible implementation manner, the receiving unit is further configured to receive a radio resource control connection reconfiguration message sent by the scheduling device, where the radio resource control connection reconfiguration message includes parameter information and a feedback manner of the second channel status information, and the parameter information is information that is determined by the scheduling device and used by the UE to sense the channel;

or the radio resource control connection reconfiguration message includes the parameter information, a feedback manner of the second channel status information, first reservation information, and second reservation information, the first reservation information is information indicating that the scheduling device determines, according to the channel status obtained by means of monitoring, that the UE needs to reserve the channel, and the second reservation information is information indicating that the scheduling device determines that the UE reserves the channel by using a CTS frame or an RTS frame.

With reference to the first possible implementation manner, in a second possible implementation manner, the receiving unit is further configured to receive the radio resource control connection reconfiguration message sent by the eNB, where the second reservation information in the radio resource control connection reconfiguration message indicates information about the maximum power, and the maximum power is a maximum power that is determined by the eNB and required for sending a CTS frame or an RTS frame by the UE.

With reference to the fourth aspect, the first possible implementation manner, and the second possible implementation manner, in a third possible implementation manner, the sending unit is specifically configured to send, on the channel that is reserved by the scheduling device and indicated by the first channel status information, a control frame by using a power that is less than the maximum power, so as to reserve the channel, where the control frame is a request to send RTS frame or a clear to send CTS frame.

With reference to the fourth aspect, the first possible implementation manner, the second possible implementation manner, and the third possible implementation manner, in a fourth possible implementation manner, the RTS frame or the CTS frame further includes a field that indicates a radio access technology to which the control frame belongs, and the field is used to indicate that the channel is occupied by the radio access technology.

According to a fifth aspect of the present invention, an unlicensed spectrum scheduling device is provided, where the scheduling device is an evolved NodeB eNB and/or a remote radio head RRH, including:

a processor, configured to: monitor a status of a channel, and if determining by means of monitoring that the channel is idle, enable a transmitter to send a control frame on the channel so as to reserve the channel, where a frequency domain resource occupied by the channel is in an unlicensed spectrum;

the transmitter, further configured to send first channel status information to user equipment UE, where the first channel status information indicates that the scheduling device has reserved the channel; and a receiver, configured to receive second channel status information fed back by the UE, and enable the processor to determine, according to the second channel status information, whether to schedule the UE, where the second channel status information is generated by the UE according to the channel status obtained by means of monitoring.

With reference to the fifth aspect, in a first possible implementation manner, the transmitter is further configured to send a radio resource control connection reconfiguration message to the UE, where the radio resource control connection reconfiguration message includes parameter information and a feedback manner of the second channel status information, and the parameter information is information that is determined by the scheduling device and used by the UE to sense the channel;

or the radio resource control connection reconfiguration message includes the parameter information, a feedback manner of the second channel status information, first reservation information, and second reservation information, the first reservation information is information indicating that the scheduling device determines, according to the channel status obtained by means of monitoring, that the UE needs to reserve the channel, and the second reservation information is information indicating that the scheduling device determines that the UE reserves the channel by using a CTS frame or an RTS frame.

With reference to the first possible implementation manner, in a second possible implementation manner, the processor is further configured to determine a maximum power required for sending a CTS frame or an RTS frame by the UE, where the second reservation information indicates information about the maximum power.

With reference to the fifth aspect, the first possible implementation manner, and the second possible implementation manner, in a third possible implementation manner, the RTS frame or the CTS frame further includes a field that indicates a radio access technology to which the control frame belongs, and the field is used to indicate that the channel is occupied by the radio access technology.

According to a sixth aspect of the present invention, user equipment UE is provided, including:

a processor, configured to monitor a status of a channel, and generate second channel status information according to the channel status obtained by means of monitoring;

a receiver, configured to receive first channel status information sent by the scheduling device, where the first channel status information indicates that the scheduling device has reserved the channel, a frequency domain resource occupied by the channel is in an unlicensed spectrum, and the scheduling device is an evolved NodeB eNB and/or a remote radio head RRH; and a transmitter, configured to feed back the second channel status information to the scheduling device, so that the scheduling device determines, according to the second channel status information, whether to schedule the UE.

With reference to the sixth aspect, in a first possible implementation manner, the receiver is further configured to receive a radio resource control connection reconfiguration message sent by the scheduling device, where the radio resource control connection reconfiguration message includes parameter information and a feedback manner of the second channel status information, and the parameter information is information that is determined by the scheduling device and used by the UE to sense the channel;

or the radio resource control connection reconfiguration message includes the parameter information, a feedback manner of the second channel status information, first reservation information, and second reservation information, the first reservation information is information indicating that the scheduling device determines, according to the channel status obtained by means of monitoring, that the UE needs to reserve the channel, and the second reservation information is information indicating that the scheduling device determines that the UE reserves the channel by using a CTS frame or an RTS frame.

With reference to the first possible implementation manner, in a second possible implementation manner, the receiver is further configured to receive the radio resource control connection reconfiguration message sent by the eNB, where the second reservation information in the radio resource control connection reconfiguration message indicates information about the maximum power, and the maximum power is a maximum power that is determined by the eNB and required for sending a CTS frame or an RTS frame by the UE.

With reference to the second possible implementation manner, in a third possible implementation manner, the transmitter is specifically configured to send, on the channel that is reserved by the scheduling device and indicated by the first channel status information, a control frame by using a power that is less than the maximum power, so as to reserve the channel, where the control frame is a request to send RTS frame or a clear to send CTS frame.

With reference to the sixth aspect, the first possible implementation manner, the second possible implementation manner, and the third possible implementation manner, in a fourth possible implementation manner, the RTS frame or the CTS frame further includes a field that indicates a radio access technology to which the control frame belongs, and the field is used to indicate that the channel is occupied by the radio access technology.

The embodiments of the present invention provide the unlicensed spectrum scheduling method and device, and the UE. The method includes: monitoring, by a scheduling device, a status of a channel, and if determining by means of monitoring that the channel is idle, sending a control frame on the channel so as to reserve the channel, where a frequency domain resource occupied by the channel is in an unlicensed spectrum, and the scheduling device is an eNB and/or an RRH; sending first channel status information to user equipment UE, where the first channel status information indicates that the scheduling device has reserved the channel; and receiving second channel status information fed back by the UE, and determining, according to the second channel status information, whether to schedule the UE, where the second channel status information is generated by the UE according to the channel status obtained by means of monitoring. In this way, a scheduling device in LTE may monitor and reserve an unlicensed spectrum, so that LTE may support LBT and channel reservation. Based on this, the scheduling device schedules idle UE on a reserved channel that occupies a frequency domain resource in an unlicensed spectrum, so that LTE supports LBT, a channel is reserved, and UE is scheduled on the reserved channel. After the scheduling device reserves the channel, another device in another system does not contend for or interfere with the channel. Therefore, it is ensured that the LTE system more properly shares the unlicensed spectrum with another device or another system.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

FIG. 1 is a schematic diagram of a scenario in which an LTE system and a WiFi system coexist in an unlicensed spectrum;

FIG. 2 is a flowchart of an unlicensed spectrum scheduling method according to an embodiment of the present invention;

DESCRIPTION OF EMBODIMENTS

Figure 3:
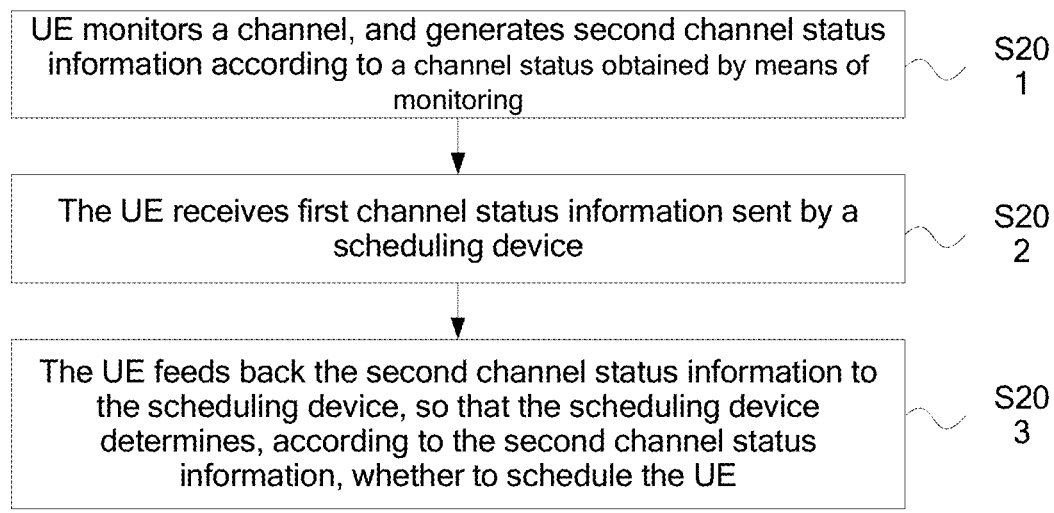
FIG. 3 is a flowchart of another unlicensed spectrum scheduling method according to an embodiment of the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

It should be noted that, this embodiment is described by using an example in which an LTE system and a WiFi system coexist in an unlicensed spectrum, but is not limited to this scenario (in this scenario, meanings of WiFi and a wireless local area network (Wireless Local Area Networks, WLAN) are the same). A scheduling method and device, and user equipment (User Equipment, UE) that are provided by embodiments of the present invention are also applicable to a scenario in which more other systems coexist. For a cellular system, the LTE system is used as an example in the present invention, and the disclosed method is certainly also applicable to another cellular system such as the Universal Mobile Telecommunications System (Universal Mobile Telecommunications System, UMTS), the Global System for Mobile Communications (Global System for Mobile Communication, GSM), or Code Division Multiple Access (Code Division Multiple Access, CDMA) 2000. An LTE eNodeB may generally be classified as a pico evolved NodeB (Pico evolved Node Base, Pico eNB), a small eNB (Micro or small eNB), or a macro eNB (macro eNB) according to different transmit power and downlink (downlink) coverage. The small eNB and the pico evolved NodeB are more suitable to use an unlicensed spectrum, mainly because transmit power of the small eNB and the pico evolved NodeB is small, and interference to another system is also relatively easy to flexibly control. The macro eNB generally needs to use an unlicensed spectrum with reference to a beamforming (beamforming) technology, so as to avoid causing extensive interference in relatively large coverage. The LTE eNodeB involved in the present invention may be any one of the foregoing eNodeBs.

In the present invention, a device of the LTE system performs LBT in a manner of carrier-sense multiple access/collision avoidance (Carrier-Sense Multiple Access/Collision avoidance, CSMA/CA), or the LTE system performs LBT in a manner of CSMA/CA by using an integrated or a connected WiFi module. After detecting that a channel is idle, the LTE system reserves the channel in a manner of request to send (Request To Send, RTS) and/or clear to send (Clear To Send, CTS), or reserves the channel in a manner of RTS and/or CTS by using an integrated or a connected WiFi module.

A channel in the embodiments of the present invention refers to one or more channels in an unlicensed spectrum, and each channel represents a specific frequency range. For example, for multiple channels from 5.725 GHz to 5.825 GHz, a width of each channel is 20 MHz. FIG. 1 is a schematic diagram of a scenario in which an LTE system and a WiFi system coexist in an unlicensed spectrum. As shown in FIG. 1, the LTE system 1 includes a scheduling device 10, and the scheduling device 10 may be an eNB or a remote radio head (Remote Radio Head, RRH). The eNB or the RRH of the LTE system obtains a channel, and starts to send an LTE signal in a cell corresponding to a frequency resource corresponding to the channel. A WiFi device 60 in the cell can detect that the channel is busy, but UE 30 on a cell edge may be interfered by a neighboring hidden node. Moreover, a time domain granularity of an LTE signal is greater than a time domain granularity of a WiFi signal. For example, one orthogonal frequency division multiplexing (Orthogonal Frequency Division Multiplexing, OFDM) symbol (symbol) of an LTE signal occupies 71.43 microseconds, and one OFDM symbol of a WiFi signal occupies four microseconds; that is, a time domain granularity of an LTE signal is greater than a time domain granularity of a WiFi signal. Therefore, the WiFi device 60 in the cell may still detect that the channel is idle in an interval between LTE signals, and therefore preempts the channel, but actually, LTE may still need to continue to use the channel. In view of the foregoing problem, main content of the present invention is performing channel reservation by means of cooperation between devices such as the eNB, the RRH, and UE in the LTE system so as to schedule the UE 30 on an idle unlicensed frequency domain channel. In the embodiments of the present invention, a CA working manner is used, and a primary serving cell (PCell) and a secondary serving cell (SCell) are included. A frequency resource corresponding to a channel in an unlicensed spectrum is used in the SCell, and a frequency resource in a licensed spectrum is used in the PCell. The PCell and the SCell may be provided by a same eNodeB, or may be provided by different eNodeBs.

FIG. 2 is a flowchart of an unlicensed spectrum scheduling method according to an embodiment of the present invention. As shown in FIG. 2, the method includes:

S101. A scheduling device monitors a channel, and if determining by means of monitoring that the channel is idle, sends a control frame on the channel so as to reserve the channel.

It should be noted that, a frequency domain resource occupied by the channel is in an unlicensed spectrum, and the occupied frequency domain resource is as the foregoing example, which is not described in detail herein.

Further, the sending a control frame on the channel so as to reserve the channel may include two reservation manners: instantly reserving the channel and reserving the channel if the channel is still idle after waiting for a preset time interval. The preset time interval may be a distributed coordination function (Distributed coordination function, DCF) interframe space (DCF inter frame space, DIFS), a short interframe space (short inter frame space, SIFS), or the like that is specified by an existing WiFi technology, or may use a time granularity determined by an OFDM symbol of LTE, for example, time 71.43 microseconds of one OFDM symbol or time of multiple OFDM symbols.

For example, the scheduling device may monitor the channel by means of CSMA and CA, and start to send an LTE signal when the channel is in an available state. An eNB may also monitor a channel by using an integrated or a connected WiFi module. The control frame may be an RTS frame or a CTS frame, and an RTS frame or a CTS frame may be separately sent on each channel of multiple channels, so as to simultaneously reserve the multiple channels. The CTS frame is a clear to send to self CTS-to-self frame, where a receiving address of the CTS-to-self frame is a sending address, that is, addresses of a sender and a receiver are the same.

It should be noted that, when an eNB and/or an RRH sends a CTS to self frame so as to reserve a channel, the CTS frame may include network allocation vector (Network Allocation Vector, NAV) reservation time information. A WiFi access point (Access Point, AP) and a station (Station, STA) that are in a cell receive the frame, and the AP and the STA may stop, in an NAV time range, contending with an LTE system for the channel, that is, stop contending with the eNB, the RRH, or UE.

Further, when sending the CTS frame, the eNB and/or the RRH perform/performs the sending according to WiFi physical layer and media access control (Media Access Control, MAC) layer standards, including a time-frequency domain resource, a modulation and coding scheme (Modulation Coding Scheme, MCS), a physical layer frame format, a MAC layer frame format, and the like, so that the WiFi AP, the STA, and the like can properly receive and decode the CTS frame. The eNB may also send the CTS frame by using an integrated or a connected WiFi module.

Further, the RTS frame or the CTS frame further includes a field that indicates a radio access technology to which the control frame belongs, and the field is used to indicate that the channel is occupied by the radio access technology. For example, the CTS frame may be expanded. A radio access type (Radio Access Type, RAT) field is added to the frame, and information in the field is set to related information about LTE. Therefore, after receiving the CTS frame, the UE or another neighboring eNB may learn that a scheduling device of an LTE system reserves the channel, so that the UE or the another neighboring eNB performs processing that is different from processing of an obtained CTS frame sent by another system. In this case, the channel is considered to be in an available state. Between intra-frequency neighboring cells in the LTE system, an existing enhanced inter-cell interference coordination (Enhanced Inter Cell Interference Coordination, eICIC) technology or a coordinated multi-point (Coordinated multi-point, CoMP) technology may be used to resolve neighboring cell co-channel interference. RAT type field information may be placed after a frame check sequence (Frame Check Sequence, FCS) field of the CTS frame, and the WiFi AP or the STA may not need to parse information in the field.

S102. The scheduling device sends first channel status information to UE, where the first channel status information indicates that the scheduling device has reserved the channel.

For example, the first channel status information may be control information indicating that the channel is occupied by the LTE system, for example, physical downlink control channel (Physical Downlink Control Channel, PDCCH) signaling, media access control control element (Media Access Control Control Element, MAC CE) signaling, or characteristic information of the LTE system. For example, the eNodeB may directly send information such as a synchronization signal, a reference signal, or the like of LTE, so that the UE may detect the characteristic information and determine that the channel is occupied by LTE. The characteristic information of the LTE system includes at least one or more of the following content: a primary synchronization signal (Primary Synchronization Signal, PSS), a secondary synchronization signal (Secondary Synchronization Signal, SSS), a cell-specific reference signal (Cell Reference Signal, CRS), a channel state information reference signal (Channel State Information Reference Signal, CSI-RS), and the like that are of LTE. For another example, the first channel status information may be indicated by using an RTS frame or a CTS frame. The UE receives an RTS frame or a CTS frame in which a sending address is a MAC address of the eNB, and determines that the scheduling device has reserved the channel. Alternatively, the first channel status information may be notified by using dedicated signaling or group scheduling signaling indicated by a PDCCH, and so on.

The eNB indicates information such as time-frequency domain resource allocation information and an MCS that are of a CTS frame by using a PDCCH, so that the UE can properly receive the CTS frame sent by the eNB and obtain NAV information in the CTS frame. The foregoing information uses a WiFi physical layer resource allocation manner, for example, uses a time domain granularity different from that of an LTE technology. The eNB may indicate, by using a PDCCH code point different from that in the prior art, that the subframe is a subframe that includes information about a WiFi control frame, or that one or more OFDM symbols of the subframe are an OFDM symbol that includes information about a WiFi control frame, so that the UE receives the CTS frame in a manner different from that in an existing LTE technology, that is, a manner of following the WiFi physical layer and MAC layer standards.

Further, before the scheduling device receives second channel status information fed back by the UE, the scheduling device sends a radio resource control connection reconfiguration message to the UE, where the radio resource control connection reconfiguration message includes parameter information and a feedback manner of the second channel status information, and the parameter information is information that is determined by the scheduling device and used by the UE to sense the channel.

Alternatively, in addition to the foregoing information, the radio resource control connection reconfiguration message may further include radio resource information required for receiving the CTS frame by the UE, for example, information such as a frequency resource or an MCS for receiving the CTS frame. The radio resource information takes effect when the UE receives a subframe indicated by a PDCCH of the eNodeB.

For example, when the scheduling device sends a radio resource control connection reconfiguration (Radio Resource Control Connection Reconfiguration) message to UE, the scheduling device selects only some UE and sends the radio resource control connection reconfiguration message to the some UE. For example, the eNB determines, according to a report of radio resource management (Radio Resource Management, RRM) or preset channel status indication (Channel Quality Indication, CQI) measurement performed on a PCell and/or an SCell by UE, UE that is on a cell edge, selects some of the UE on a cell edge, and sends the foregoing radio resource control connection reconfiguration message to the some UE.

The radio resource control connection reconfiguration message may further include information such as the parameter information for sensing and the feedback manner used by the UE to feed back the second channel status information. For example, the parameter information may be a channel sensing period, a channel sensing energy threshold, starting sensing according to an instruction of the eNB, or the like. The feedback manner may be feeding back on a physical uplink control channel (Physical Uplink Control Channel, PUCCH) of a cell in a licensed spectrum by using a preset scheduling request (Scheduling Request, SR), a preset CQI value, or the like, and the UE automatically performs a feedback or performs a feedback according to an instruction of the eNB. For the feedback, the UE may also be configured to use a preamble (preamble) of a physical random access channel (Physical Random Access Channel, PRACH) in an unlicensed spectrum to perform the feedback. Presetting means that the scheduling device makes a common agreement with the UE, for example, the preset CQI value may be a value such as 15 or 0, which varies according to specific implementation and is not limited herein.

S103. The scheduling device receives second channel status information fed back by the UE, and determines, according to the second channel status information, whether to schedule the UE.

The second channel status information is generated by the UE according to a channel status obtained by means of monitoring.

Further, the determining, according to the second channel status information, whether to schedule the UE may be: the UE detecting interference information or receiving channel reservation information of another system, and generating second channel status information that carries the foregoing content or information that indicates the foregoing content, so that the eNodeB determines, according to the content, to skip scheduling the UE at this time. Alternatively, after sending the first channel status information to the UE, the eNodeB determines, if receiving no second channel status information of the UE, to skip scheduling the UE at this time. Moreover, the eNB determining whether to schedule UE may be: the eNB determining whether to schedule UE that sends second channel status information or other UE relatively close to the UE.

The scheduling device may be at least one of an eNB or an RRH. When the scheduling device is an RRH, the RRH does not make a scheduling decision but sends scheduling information generated by an eNB to schedule UE.

It should be noted that, the eNB or the RRH schedules the UE if determining, according to the second channel status information, that the channel monitored by the UE is idle; or the eNB or the RRH does not schedule the UE if determining, according to the second channel status information, that the channel monitored by the UE is occupied by another system. The UE and the scheduling device monitor the same channel at different spatial positions. For example, the eNB cannot learn by monitoring whether a device of another system outside coverage of the cell interferes with UE on a cell edge, but the UE on a cell edge can monitor this. The channel herein refers to a frequency range represented by a frequency channel number.

The embodiment of the present invention provides the unlicensed spectrum scheduling method. The method includes: monitoring, by a scheduling device, a status of a channel, and if determining by means of monitoring that the channel is idle, sending a control frame on the channel so as to reserve the channel, where a frequency domain resource occupied by the channel is in an unlicensed spectrum, and the scheduling device is an eNB and/or an RRH; sending first channel status information to user equipment UE, where the first channel status information indicates that the scheduling device has reserved the channel; and receiving second channel status information fed back by the UE, and determining, according to the second channel status information, whether to schedule the UE, where the second channel status information is generated by the UE according to the channel status obtained by means of monitoring. In this way, a scheduling device in LTE may monitor and reserve an unlicensed spectrum, so that LTE may support LBT and channel reservation. Based on this, UE is scheduled on a reserved channel that is in the unlicensed spectrum. After the scheduling device reserves the channel, another device in another system does not contend for or interfere with the channel. Therefore, it is ensured that the LTE system more properly shares the unlicensed spectrum with another device or another system.

FIG. 3 is a flowchart of another unlicensed spectrum scheduling method according to an embodiment of the present invention. As shown in FIG. 3, the method includes:

S201. UE monitors a channel, and generates second channel status information according to a channel status obtained by means of monitoring.

For example, the UE may perform monitoring every 30 milliseconds, that is, enable the monitoring every 30 milliseconds.

S202. The UE receives first channel status information sent by a scheduling device. The first channel status information indicates that the scheduling device has reserved the channel, a frequency domain resource occupied by the channel is in an unlicensed spectrum, and the scheduling device is an eNB and/or an RRH. It should be noted that, the first channel status information received by the UE is the same as that sent by the scheduling device, which is described in the foregoing embodiment, and details are not described herein.

It should be noted that, for a case in which the UE is triggered, after receiving the first channel status information of the scheduling device, to start the monitoring, the UE may need to perform, by using a CSMA and CA mechanism, the monitoring only in a time range indicated by an NAV value included in a CTS frame. Further, before receiving the first channel status information, the UE may receive a radio resource control connection reconfiguration message sent by the scheduling device, where the radio resource control connection reconfiguration message includes parameter information and a feedback manner of the second channel status information, and the parameter information is information that is determined by the scheduling device and used by the UE to sense the channel. The radio resource control connection reconfiguration message received by the UE is the same as that sent by the scheduling device, which is described in the foregoing embodiment, and details are not described herein.

It should be noted that, the UE may periodically and automatically enable the monitoring, or may be triggered, according to the received the first channel status information, to enable the monitoring. In FIG. 3, an example in which the UE periodically enables the monitoring of the channel is used for description, that is, an example in which S201 is performed before S202 is used for description. The case in which the UE is triggered, after receiving the first channel status information, to enable the monitoring of the channel also falls within the protection scope, that is, performing S202 first and then performing S201 also falls within the protection scope, which is not limited by the illustration in FIG. 3.

S203. The UE feeds back the second channel status information to the scheduling device, so that the scheduling device determines, according to the second channel status information, whether to schedule the UE.

It should be noted that, the UE may feed back the second channel status information to the scheduling device by using the feedback manner indicated by the foregoing radio resource control connection reconfiguration message. The feedback may be instantly notifying the scheduling device after learning, for the first time, that the channel is in an available state and notifying the scheduling device again when the available state of the channel changes.

Further, the feedback manner may be feeding back on a PUCCH that is in a licensed spectrum by using an SR, and feeding back on a PRACH that is in an unlicensed spectrum by using a preamble or by using a preset CQI value, and the feeding back manner is automatically performed by the UE or is performed according to an instruction of the eNB. The preset CQI value may be a preset value that is known to the UE and the scheduling device, for example, a value such as 15 or 0.

The embodiment of the present invention provides the unlicensed spectrum scheduling method. The method includes: monitoring, by UE, a status of a channel, and sending second channel status information on the channel if determining by means of monitoring that the channel is idle, where a frequency domain resource occupied by the channel is in an unlicensed spectrum, and a scheduling device is an eNB and/or an RRH. In this way, a scheduling device in LTE may monitor and reserve an unlicensed spectrum, so that LTE may support LBT and channel reservation. Based on this, UE is scheduled on a reserved channel that is in the unlicensed spectrum. After the scheduling device reserves the channel, another device in another system does not contend for or interfere with the channel. Therefore, it is ensured that the LTE system more properly shares the unlicensed spectrum with another device or another system.

Figure 4:
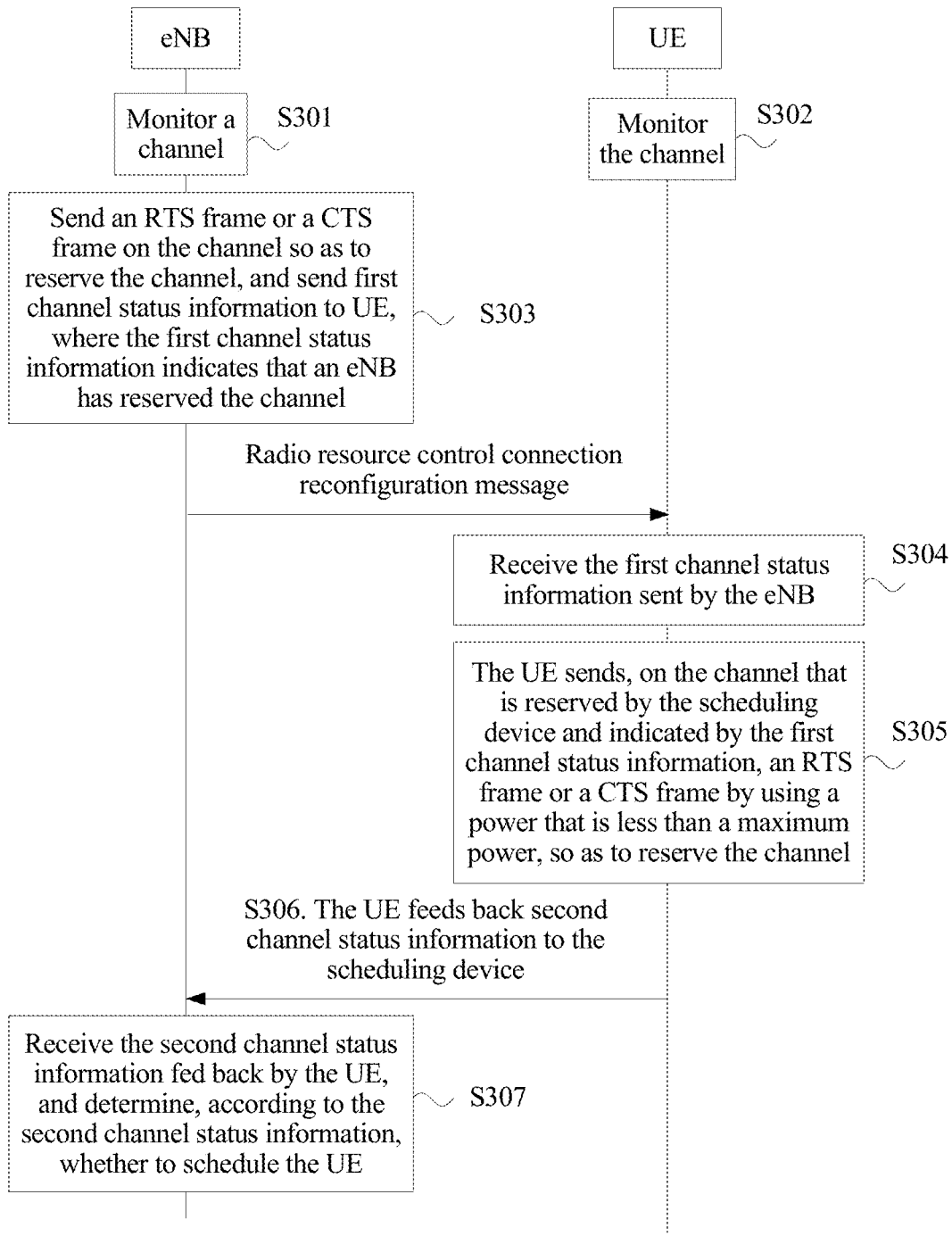
FIG. 4 is a flowchart of still another unlicensed spectrum scheduling method according to an embodiment of the present invention.

FIG. 4 is a flowchart of still another unlicensed spectrum scheduling method according to an embodiment of the present invention. As shown in FIG. 4, a difference between the method in this embodiment and the methods provided in FIG. 2 and FIG. 3 is that, based on the methods provided in FIG. 2 and FIG. 3, UE is enabled to participate in a channel reservation process. When detecting, according to a configuration, that a channel is available, the UE may actively reserve the channel and notify a scheduling device; or the UE reserves a channel according to an instruction of a scheduling device. In this way, successful channel reservation may further be ensured. It should be noted that, in this embodiment, an example in which the scheduling device is an eNB is used for description, but not for limitation. An RRH can also monitor a channel, and can execute the following operations except determining a maximum power required for sending a CTS frame or an RTS frame by the UE. The method includes:

S301. The eNB monitors a channel.

S302. The UE monitors the channel.

Further, the UE may be triggered to enable monitoring of the channel after receiving first channel status information of the eNB, or the UE may periodically and automatically monitor the channel. A specific monitoring enablement manner is described in the foregoing embodiment, and details are not described herein. It should be noted that, there is no order between S301 and S302, and S301 and S302 may be performed at the same time.

Further, before the UE reserves the channel according to a result of the channel monitoring, the eNB may determine information about a maximum power required for sending a CTS frame or an RTS frame by the UE, and send a radio resource control connection reconfiguration message to the UE. Further, the information about the maximum power may be configured on the UE by the eNB before the UE reserves the channel according to the result of the channel monitoring.

The radio resource control connection reconfiguration message includes information that indicates the maximum power. The maximum power is a maximum power that is determined by the eNB and required for sending a CTS frame or an RTS frame by the UE. For example, the eNB may determine, according to historical interference information, position information, and the like reported by the UE, information such as a position and transmit power that are of a WiFi AP or a WiFi STA that is in LTE neighboring cell coverage and that may affect UE on a cell edge, and/or interact the foregoing information of the WiFi AP or the WiFi STA with an eNB of a neighboring cell, so as to calculate the maximum power.

Further, in addition to the foregoing information that indicates the maximum power, the radio resource control connection reconfiguration message may further include parameter information and a feedback manner of second channel status information, and the parameter information is information that is determined by the scheduling device and used by the UE to sense the channel.

Alternatively, the radio resource control connection reconfiguration message may further include parameter information, a feedback manner of second channel status information, first reservation information, and second reservation information. The first reservation information is information indicating that the scheduling device determines, according to a channel status obtained by means of monitoring, that the UE needs to reserve the channel, and the second reservation information is information indicating that the scheduling device determines that the UE reserves the channel by using a CTS frame or an RTS frame.

Further, the second reservation information may indicate the foregoing information about the maximum power, and the information about the maximum power is a maximum power required for sending a CTS frame or an RTS frame by the UE.

Alternatively, the second reservation information may further include radio resource information required for receiving a CTS frame by the UE, for example, information such as a frequency resource or a modulation and coding scheme (Modulation and Coding Scheme, MCS) for receiving the CTS frame. The radio resource information takes effect when the UE receives a subframe indicated by a PDCCH of the eNodeB.

Alternatively, the second reservation information may further include radio resource information required for sending a CTS frame by the UE, for example, information such as a frequency resource or an MCS for sending the CTS frame. The radio resource information takes effect when the UE receives the $K^{th}$ subframe after a subframe indicated by a PDCCH of the eNodeB. For example, K is assigned a value 3 in an LTE frequency division duplex (frequency division duplex, FDD) mode.

It should be noted that, the UE may not only receive a CTS frame or an RTS frame sent by the eNB, but also need to send a CTS frame. Therefore, radio resource information of the eNB indicates that the UE receives a CTS frame or an RTS frame and sends a CTS frame by using different OFDM symbols, that is, time-frequency domain resources for receiving and sending are different.

The UE may also be configured, by the eNB, to use a power used when normally sending uplink information in LTE to send a CTS frame. In this case, for a downlink subframe, the eNB dynamically specifies, by using the PDCCH, the subframe or one or more orthogonal frequency division multiplexing (Orthogonal Frequency Division Multiplexing, OFDM) symbols of the subframe to be temporarily changed to uplink, which, however, is only for the UE. The eNB may still use the subframe or the one or more OFDM symbols of the subframe as downlink to schedule other UE that is relatively far from the UE.

It should be noted that, if the eNB sends the radio resource control connection reconfiguration message to the UE, the UE receives the radio resource control connection reconfiguration message sent by the eNB, and performs configuration according to a message in the received radio resource control connection reconfiguration message.

S303. The eNB sends an RTS frame or a CTS frame on the channel so as to reserve the channel, and sends first channel status information to the UE, where the first channel status information indicates that the eNB has reserved the channel.

It should be noted that, the first channel status information has been described in detail in the foregoing embodiment, and details are not described herein. Specifically, the eNB may send the first channel status information to the UE in at least one of the following manners: dedicated signaling or group scheduling signaling indicated by the PDCCH, a MAC CE, characteristic information of the LTE system, an RTS frame or a CTS frame, or the like.

S304. The UE receives the first channel status information sent by the eNB. For example, the UE receives, in at least one of the following manners, the first channel status information sent by the eNB: receiving an LTE synchronization signal, dedicated signaling or group scheduling signaling, a MAC CE, or an RTS frame or a CTS frame that is sent by the eNB.

The UE determines, in at least one of the foregoing manners, that the LTE system in which the eNB is located is enabled.

Further, the eNB may send a CTS frame, or may send an RTS frame. For example, the eNB sends an RTS frame, and the UE sends a CTS frame after receiving the RTS frame.

S305. The UE sends, on the channel that is reserved by the scheduling device and indicated by the first channel status information, an RTS frame or a CTS frame by using a power that is less than a maximum power, so as to reserve the channel.

Further, after determining, according to the first reservation information and the second reservation information, that the channel is idle, the UE sends the control frame RTS or CTS so as to reserve the channel. The UE sending a control frame on the channel so as to reserve the channel may include two reservation manners: instantly reserving the channel and reserving the channel if the channel is still idle after waiting for a preset time interval, which are the same as the reservation manners of the scheduling device that are described in step S101.

For example, the UE sends the CTS frame by using a power that is less than the maximum power in the second reservation information, where the CTS frame is a CTS-to-self frame, and a receiving address of the CTS-to-self frame is a MAC address of the UE. An NAV value that is in a CTS frame and set by the UE does not exceed a range of an NAV value that is in a CTS frame and set by the eNB or a time length range specified by the eNB by using a newly introduced MAC CE.

It should be noted that, in addition to being triggered, after receiving the RTS frame or the CTS frame in step S306, to perform reservation, the UE may also actively perform reservation. For example, the UE may also actively send an RTS frame according to a status of the channel monitored by the UE, so as to reserve the channel, so that after receiving the RTS frame, the scheduling device determines whether to respond by using a CTS frame. In this case, the UE does not need to first receive the RTS frame or the CTS frame that is sent by the scheduling device. In a case in which the UE actively reserves the channel, the UE sets the NAV value to a time length required for scheduling a service by the UE, and the NAV value is not greater than a maximum NAV value specified by a WiFi standard.

Further, the foregoing RTS frame or the CTS frame further includes a field that indicates a radio access technology to which the control frame belongs, and the field is used to indicate that the channel is occupied by the radio access technology. For example, a RAT field is added to the frame, and information in the field is set to LTE. Another device that receives the expanded RTS frame may learn that the frame is sent by UE of LTE, and consider that the channel has been reserved.

If a cell resource corresponding to a channel in an unlicensed spectrum is used only in downlink of LTE or is a downlink subframe of a time division duplex (Time Division Duplex, TDD) mode, when sending a CTS frame by using a power that is not greater than the maximum power set by the eNB, the UE can directly send the CTS frame on the subframe without caring that the current subframe is a downlink subframe. When setting the maximum power, the eNB considers that the UE sending a CTS frame does not generate uplink interference to the eNB or other UE relatively close to the UE. For example, the eNB may temporarily skip scheduling UE that may be interfered. When sending a CTS frame, the UE may control, according to strength of a surrounding WiFi signal measured by the UE, path loss information, and the like, a power used to send the CTS frame, so as to perform the sending by using a power that is much less than the specified maximum power.

S306. The UE feeds back second channel status information to the scheduling device.

Further, the feedback manner is feeding back on a PUCCH that is in a licensed spectrum by using a scheduling request SR, and feeding back on a PRACH that is in an unlicensed spectrum by using a preamble or by using a preset CQI value, and the feeding back manner is automatically performed by the UE or is performed according to an instruction of the eNB.

It should be noted that, when the scheduling device does not send an instruction that triggers the UE to send the second channel status information, the UE may also actively feed back the second channel status information according to a status of the channel monitored by the UE.

S307. The eNB receives the second channel status information fed back by the UE, and determines, according to the second channel status information, whether to schedule the UE.

Further, if the eNB determines that the channel is idle, and the UE also reserves the channel, the UE is scheduled. Moreover, another device in the cell also receives the control frame used by the UE to reserve the channel. Therefore, the another device does not interfere with the channel reserved by the UE, so that before the eNB schedules the UE, the channel remains in a reserved state and is not interfered by the another device.

The embodiment of the present invention provides the unlicensed spectrum scheduling method. The method includes: monitoring, by a scheduling device, a status of a channel, and if determining by means of monitoring that the channel is idle, sending a control frame on the channel so as to reserve the channel, where a frequency domain resource occupied by the channel is in an unlicensed spectrum, and the scheduling device is an eNB and/or an RRH; sending first channel status information to user equipment UE, where the first channel status information indicates that the scheduling device has reserved the channel; and receiving second channel status information fed back by the UE, and determining, according to the second channel status information, whether to schedule the UE, where the second channel status information is generated by the UE according to the channel status obtained by means of monitoring. In this way, a scheduling device in LTE may monitor and reserve an unlicensed spectrum, so that LTE may support LBT and channel reservation. Based on this, UE is scheduled on a reserved channel that is in the unlicensed spectrum. After the scheduling device reserves the channel, another device in another system does not contend for or interfere with the channel. Therefore, it is ensured that the LTE system more properly shares the unlicensed spectrum with another device or another system.

Figure 5:
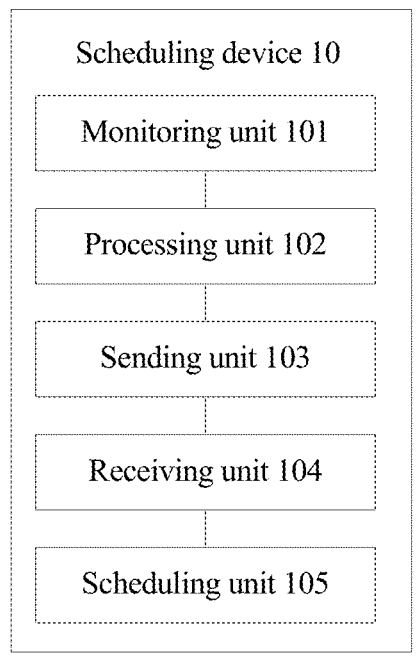
FIG. 5 is a schematic structural diagram of an unlicensed spectrum scheduling device according to an embodiment of the present invention.

FIG. 5 is a schematic structural diagram of an unlicensed spectrum scheduling device according to an embodiment of the present invention. The scheduling device may be an eNB and/or an RRH. As shown in FIG. 5, the scheduling device 10 includes: a monitoring unit 101, a processing unit 102, a sending unit 103, a receiving unit 104, and a scheduling unit 105.

The monitoring unit 101 is configured to monitor a status of a channel.

For example, the monitoring unit 101 monitors the channel by using CSMA and CA.

The processing unit 102 is configured to: if determining by means of monitoring that the channel is idle, enable the sending unit 103 to send a control frame on the channel so as to reserve the channel, where a frequency domain resource occupied by the channel is in an unlicensed spectrum.

For example, the sending unit 103 may send an RTS frame or a CTS frame on the channel so as to reserve the channel. Moreover, the CTS frame is a CTS-to-self frame, where a receiving address of the CTS-to-self frame is a sending address.

Further, the RTS frame or the CTS frame further includes a field that indicates a radio access technology to which the control frame belongs, and the field is used to indicate that the channel is occupied by the radio access technology.

The sending unit 103 is further configured to send first channel status information to user equipment UE, where the first channel status information indicates that the scheduling device has reserved the channel.

For example, the first channel status information may be represented by using at least one of an LTE signal, an RTS frame or a CTS frame, or dedicated signaling or group scheduling signaling.

Further, the sending unit 103 is further configured to send a radio resource control connection reconfiguration message to the UE, where the radio resource control connection reconfiguration message includes parameter information and a feedback manner of second channel status information, and the parameter information is information that is determined by the scheduling device and used by the UE to sense the channel.

When the UE needs to participate in channel reservation, the radio resource control connection reconfiguration message may include the foregoing parameter information and the feedback manner of the second channel status information, and may further include first reservation information and second reservation information, where the first reservation information is information indicating that the scheduling device determines, according to the channel status obtained by means of monitoring, that the UE needs to reserve the channel, and the second reservation information is information indicating that the scheduling device determines that the UE reserves the channel by using a CTS frame or an RTS frame.

For example, the feedback manner is feeding back on a PUCCH that is in a licensed spectrum by using a scheduling request SR, and feeding back on a PRACH that is in an unlicensed spectrum by using a preamble or by using a preset CQI value, and the feeding back manner is automatically performed by the UE or is performed according to an instruction of the eNB.

The receiving unit 104 is configured to receive the second channel status information fed back by the UE, and enable the scheduling unit 105 to determine, according to the second channel status information, whether to schedule the UE, where the second channel status information is generated by the UE according to the channel status obtained by means of monitoring.

For example, the scheduling unit 105 may be configured to: schedule the UE if determining, according to the second channel status information, that the channel monitored by the UE is idle; or skip scheduling the UE if determining, according to the second channel status information, that the channel monitored by the UE is occupied by another system.

Further, the sending unit 103 is further configured to send dedicated signaling or group scheduling signaling to the UE, where the dedicated signaling or the group scheduling signaling is used to notify the UE that an LTE system in which the scheduling device is located is enabled, and the dedicated signaling or the group scheduling signaling is a PDCCH or a MAC CE.

Figure 6:
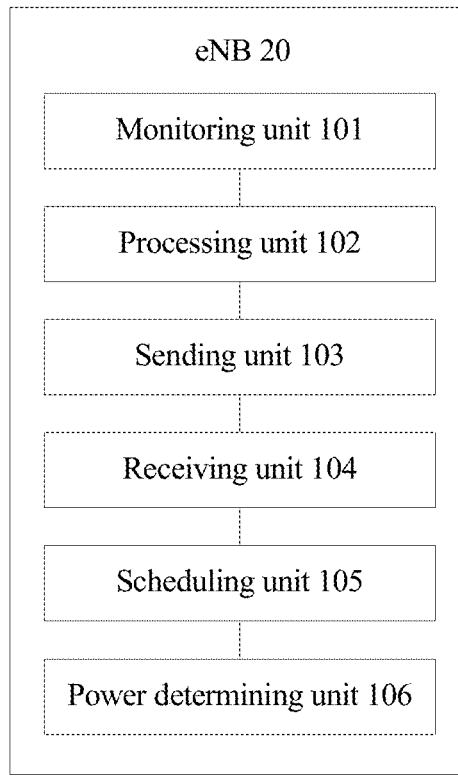
FIG. 6 is a schematic structural diagram of an eNB according to an embodiment of the present invention.

FIG. 6 is a schematic structural diagram of an eNB according to an embodiment of the present invention. As shown in FIG. 6, the eNB 20 further includes a power determining unit 106.

The power determining unit 106 is configured to determine a maximum power required for sending a CTS frame or an RTS frame by the UE.

The sending unit 103 is further configured to send the radio resource control connection reconfiguration message to the UE, where the radio resource control connection reconfiguration message may further include the first reservation information and the second reservation information, the first reservation information is information indicating that the scheduling device determines, according to the channel status obtained by means of monitoring, that the UE needs to reserve the channel, and the second reservation information is information indicating that the scheduling device determines that the UE reserves the channel by using a CTS frame or an RTS frame.

Further, the second reservation information in the radio resource control connection reconfiguration message may include information that indicates the maximum power.

The scheduling device 10 provided by the embodiment of the present invention is a device for executing an unlicensed spectrum scheduling method. For a specific process of executing the unlicensed spectrum scheduling method by the scheduling device 10, reference may be made to the method embodiments shown in FIG. 1 to FIG. 4, and details are not described herein.

The embodiment of the present invention provides the unlicensed spectrum scheduling device. The scheduling device monitors a status of a channel, and if determining by means of monitoring that the channel is idle, sends a control frame on the channel so as to reserve the channel, where a frequency domain resource occupied by the channel is in an unlicensed spectrum, and the scheduling device is an eNB and/or an RRH; sends first channel status information to user equipment UE, where the first channel status information indicates that the scheduling device has reserved the channel; receives second channel status information fed back by the UE, and determines, according to the second channel status information, whether to schedule the UE, where the second channel status information is generated by the UE according to the channel status obtained by means of monitoring. In this way, a scheduling device in LTE may monitor and reserve an unlicensed spectrum, so that LTE may support LBT and channel reservation. Based on this, UE is scheduled on a reserved channel that is in the unlicensed spectrum. After the scheduling device reserves the channel, another device in another system does not contend for or interfere with the channel. Therefore, it is ensured that the LTE system more properly shares the unlicensed spectrum with another device or another system.

Figure 7:
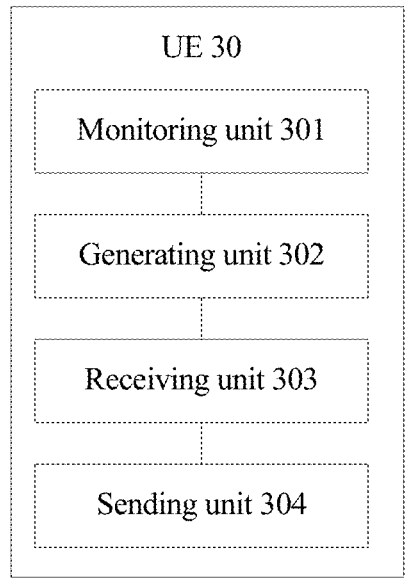
FIG. 7 is a schematic structural diagram of UE according to an embodiment of the present invention.

FIG. 7 is a schematic structural diagram of UE according to an embodiment of the present invention. As shown in FIG. 7, the UE 30 includes: a monitoring unit 301, a generating unit 302, a receiving unit 303, and a sending unit 304.

The monitoring unit 301 is configured to monitor a status of a channel, and enable the generating unit 302 to generate second channel status information according to the channel status obtained by means of monitoring.

For example, the monitoring unit 301 is specifically configured to: periodically enable monitoring of the channel; or enable, by means of triggering according to received first channel status information, monitoring of the channel.

The receiving unit 303 is configured to receive the first channel status information sent by a scheduling device.

The first channel status information indicates that the scheduling device has reserved the channel, a frequency domain resource occupied by the channel is in an unlicensed spectrum, and the scheduling device is an eNB and/or an RRH.

The sending unit 304 is configured to feed back the second channel status information to the scheduling device, so that the scheduling device determines, according to the feedback information, whether to schedule the UE.

Further, the receiving unit 303 is further configured to receive a radio resource control connection reconfiguration message sent by the eNB, where the radio resource control connection reconfiguration message includes information that indicates a maximum power, and the maximum power is a maximum power that is determined by the eNB and required for sending a CTS frame or an RTS frame by the UE.

The sending unit 304 is specifically configured to send, on the channel that is reserved by the scheduling device and indicated by the first channel status information, a control frame by using a power that is less than the maximum power, so as to reserve the channel, where the control frame is an RTS frame or a CTS frame.

For example, the receiving unit 303 is further configured to receive the radio resource control connection reconfiguration message sent by the scheduling device. When the UE does not need to reserve the channel, the radio resource control connection reconfiguration message includes parameter information and a feedback manner of the second channel status information, where the parameter information is information that is determined by the scheduling device and used by the UE to sense the channel.

When the UE needs to reserve the channel, the radio resource control connection reconfiguration message may include the parameter information, the feedback manner of the second channel status information, first reservation information, and second reservation information. The second reservation information may indicate the maximum power, and the maximum power is a maximum power that is determined by the eNB and required for sending a CTS frame or an RTS frame by the UE. The first reservation information is information indicating that the scheduling device determines, according to the channel status obtained by means of monitoring, that the UE needs to reserve the channel. The second reservation information is information indicating that the scheduling device determines that the UE reserves the channel by using a CTS frame or an RTS frame.

It should be noted that, the CTS frame is a CTS-to-self frame, where a receiving address of the CTS-to-self frame is a sending address. The RTS frame or the CTS frame further includes a field that indicates a radio access technology to which the control frame belongs, and the field is used to indicate that the channel is occupied by the radio access technology.

The feedback manner is feeding back on a PUCCH that is in a licensed spectrum by using an SR, and feeding back on a PRACH that is in an unlicensed spectrum by using a preamble or by using a preset CQI value, and the feeding back manner is automatically performed by the UE or is performed according to an instruction of the eNB.

Figure 8:
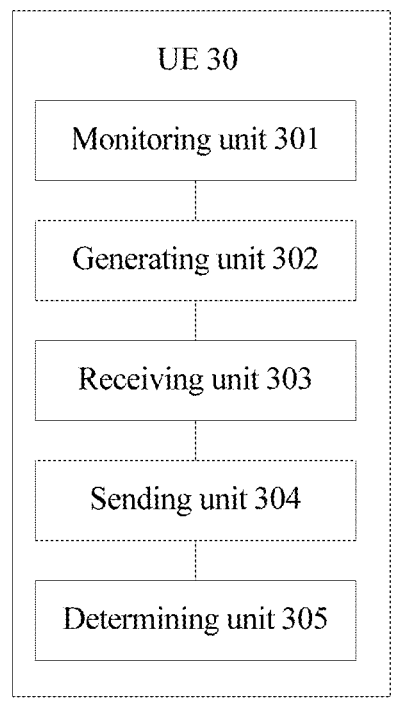
FIG. 8 is a schematic structural diagram of another UE according to an embodiment of the present invention.

Further, FIG. 8 is a schematic structural diagram of another UE according to an embodiment of the present invention. As shown in FIG. 8, based on FIG. 7, the UE further includes a determining unit 305.

The receiving unit 303 is further configured to receive dedicated signaling or group scheduling signaling sent by the scheduling device.

The determining unit 305 is configured to determine, according to the dedicated signaling or the group scheduling signaling, that an LTE system in which the scheduling device is located is enabled, where the dedicated signaling or the group scheduling signaling is a PDCCH or a MAC CE.

The UE 30 provided by the embodiment of the present invention is a device for executing an unlicensed spectrum scheduling method. For a specific process of executing the unlicensed spectrum scheduling method by the UE 30, reference may be made to the method embodiments shown in FIG. 1 to FIG. 4, and details are not described herein.

The embodiment of the present invention provides the UE. The UE monitors a status of a channel, and sends second channel status information on the channel if determining by means of monitoring that the channel is idle, where a frequency domain resource occupied by the channel is in an unlicensed spectrum, and a scheduling device is an eNB and/or an RRH. In this way, a scheduling device in LTE may monitor and reserve an unlicensed spectrum, so that LTE may support LBT and channel reservation. Based on this, UE is scheduled on a reserved channel that is in the unlicensed spectrum. After the scheduling device reserves the channel, another device in another system does not contend for or interfere with the channel. Therefore, it is ensured that the LTE system more properly shares the unlicensed spectrum with another device or another system.

Figure 9:
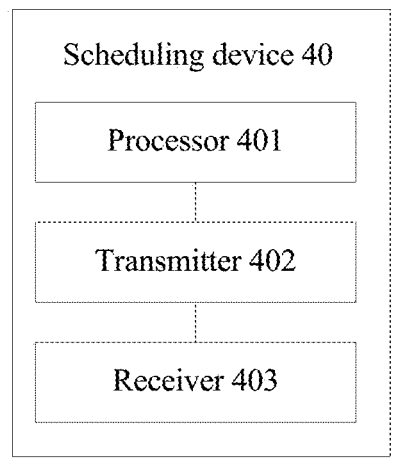
FIG. 9 is a schematic structural diagram of another unlicensed spectrum scheduling device according to an embodiment of the present invention.

FIG. 9 is a schematic structural diagram of another unlicensed spectrum scheduling device according to an embodiment of the present invention. The scheduling device may be an eNB and/or an RRH. As shown in FIG. 9, the scheduling device 40 includes: a processor 401, a transmitter 402, and a receiver 403.

The processor 401 is configured to: monitor a status of a channel, and if determining by means of monitoring that the channel is idle, enable the transmitter 402 to send a control frame on the channel so as to reserve the channel, where a frequency domain resource occupied by the channel is in an unlicensed spectrum.

For example, the processor 401 may monitor the channel by using CSMA and CA.

The transmitter 402 is further configured to send first channel status information to UE, where the first channel status information indicates that the scheduling device has reserved the channel.

For example, the transmitter 402 may send an RTS frame or a CTS frame on the channel so as to reserve the channel.

The CTS frame is a CTS-to-self frame, where a receiving address of the CTS-to-self frame is a sending address. The RTS frame or the CTS frame further includes a field that indicates a radio access technology to which the control frame belongs, and the field is used to indicate that the channel is occupied by the radio access technology.

For example, the first channel status information may be represented by using at least one of an LTE signal, an RTS frame or a CTS frame, or dedicated signaling or group scheduling signaling.

The receiver 403 is configured to receive second channel status information fed back by the UE, and enable the processor 401 to determine, according to the second channel status information, whether to schedule the UE, where the second channel status information is generated by the UE according to the channel status obtained by means of monitoring.

For example, the processor 401 is specifically configured to: schedule the UE if determining, according to the second channel status information, that the channel monitored by the UE is idle; or skip scheduling the UE if determining, according to the second channel status information, that the channel monitored by the UE is occupied by another system.

Further, the transmitter 402 is further configured to send a radio resource control connection reconfiguration message to the UE.

When the UE does not need to participate in channel reservation, the radio resource control connection reconfiguration message includes parameter information and a feedback manner of the second channel status information, where the parameter information is information that is determined by the scheduling device and used by the UE to sense the channel.

When the UE needs to participate in channel reservation, the radio resource control connection reconfiguration message includes the parameter information, the feedback manner of the second channel status information, first reservation information, and second reservation information, where the first reservation information is information indicating that the scheduling device determines, according to the channel status obtained by means of monitoring, that the UE needs to reserve the channel, and the second reservation information is information indicating that the scheduling device determines that the UE reserves the channel by using a CTS frame or an RTS frame.

Further, if the scheduling device is an eNB, the processor 401 is further configured to determine a maximum power required for sending a CTS frame or an RTS frame by the UE. The transmitter 402 is further configured to send the radio resource control connection reconfiguration message to the UE, where the second reservation information in the radio resource control connection reconfiguration message includes information that indicates the maximum power. For example, the feedback manner is feeding back on a physical uplink control channel PUCCH that is in a licensed spectrum by using a scheduling request SR, and feeding back on a physical random access channel PRACH that is in an unlicensed spectrum by using a preamble or by using a preset channel quality indication CQI value, and the feeding back manner is automatically performed by the UE or is performed according to an instruction of the eNB.

Further, the transmitter 402 is further configured to send dedicated signaling or group scheduling signaling to the UE, where the dedicated signaling or the group scheduling signaling is used to notify the UE that an LTE system in which the scheduling device is located is enabled, and the dedicated signaling or the group scheduling signaling is a PDCCH or a MAC CE.

The scheduling device 40 provided by the embodiment of the present invention is a device for executing an unlicensed spectrum scheduling method. For a specific process of executing the unlicensed spectrum scheduling method by the scheduling device 40, reference may be made to the method embodiments shown in FIG. 1 to FIG. 4, and details are not described herein.

The embodiment of the present invention provides the unlicensed spectrum scheduling device. The scheduling device monitors a status of a channel, and if determining by means of monitoring that the channel is idle, sends a control frame on the channel so as to reserve the channel, where a frequency domain resource occupied by the channel is in an unlicensed spectrum, and the scheduling device is an eNB and/or an RRH; sends first channel status information to user equipment UE, where the first channel status information indicates that the scheduling device has reserved the channel; receives second channel status information fed back by the UE, and determines, according to the second channel status information, whether to schedule the UE, where the second channel status information is generated by the UE according to the channel status obtained by means of monitoring. In this way, a scheduling device in LTE may monitor and reserve an unlicensed spectrum, so that LTE may support LBT and channel reservation. Based on this, UE is scheduled on a reserved channel that is in the unlicensed spectrum. After the scheduling device reserves the channel, another device in another system does not contend for or interfere with the channel. Therefore, it is ensured that the LTE system more properly shares the unlicensed spectrum with another device or another system.

Figure 10:
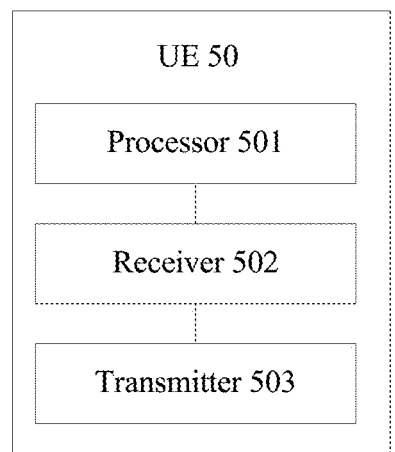
FIG. 10 is a schematic structural diagram of another UE according to an embodiment of the present invention.

FIG. 10 is a schematic structural diagram of another UE according to an embodiment of the present invention. As shown in FIG. 10, the UE 50 includes: a processor 501, a receiver 502, and a transmitter 503.

The processor 501 is configured to monitor a status of a channel, and generate second channel status information according to the channel status obtained by means of monitoring.

Further, the processor 501 is specifically configured to: periodically enable monitoring of the channel; or enable, by means of triggering according to received first channel status information, monitoring of the channel.

The receiver 502 is configured to receive the first channel status information sent by a scheduling device, where the first channel status information indicates that the scheduling device has reserved the channel, a frequency domain resource occupied by the channel is in an unlicensed spectrum, and the scheduling device is an evolved NodeB eNB and/or a remote radio head RRH.

The transmitter 503 is configured to feed back the second channel status information to the scheduling device, so that the scheduling device determines, according to the feedback information, whether to schedule the UE.

Further, a radio resource control connection reconfiguration message may further include first reservation information and second reservation information, where the first reservation information is information indicating that the scheduling device determines, according to the channel status obtained by means of monitoring, that the UE needs to reserve the channel, and the second reservation information is information indicating that the scheduling device determines that the UE reserves the channel by using a CTS frame or an RTS frame.

Further, the receiver 502 is further configured to receive a radio resource control connection reconfiguration message sent by the eNB, where second reservation information in the radio resource control connection reconfiguration message includes information that indicates a maximum power, and the maximum power is a maximum power that is determined by the eNB and required for sending a CTS frame or an RTS frame by the UE.

The transmitter 503 is specifically configured to send, on the channel that is reserved by the scheduling device and indicated by the first channel status information, a control frame by using a power that is less than the maximum power, so as to reserve the channel, where the control frame is an RTS frame or a CTS frame.

For example, the CTS frame is a clear to send to self CTS-to-self frame, where a receiving address of the CTS-to-self frame is a sending address. The RTS frame or the CTS frame further includes a field that indicates a radio access technology to which the control frame belongs, and the field is used to indicate that the channel is occupied by the radio access technology.

Further, the receiver 502 is further configured to receive the radio resource control connection reconfiguration message sent by the scheduling device. When the UE does not need to reserve the channel, the radio resource control connection reconfiguration message includes parameter information and a feedback manner of the second channel status information, where the parameter information is information that is determined by the scheduling device and used by the UE to sense the channel. When the UE needs to reserve the channel, the radio resource control connection reconfiguration message includes the parameter information, the feedback manner of the second channel status information, first reservation information, and second reservation information, where the first reservation information is information indicating that the scheduling device determines, according to the channel status obtained by means of monitoring, that the UE needs to reserve the channel, and the second reservation information is information indicating that the scheduling device determines that the UE reserves the channel by using a CTS frame or an RTS frame.

Further, when the maximum power required for sending a CTS frame or an RTS frame by the UE is set on the UE, the radio resource control connection reconfiguration message does not need to indicate the maximum power.

For example, the feedback manner is feeding back on a PUCCH that is in a licensed spectrum by using an SR, and feeding back on a PRACH that is in an unlicensed spectrum by using a preamble or by using a preset CQI value, and the feeding back manner is automatically performed by the UE or is performed according to an instruction of the eNB.

Further, the receiver 502 is further configured to receive dedicated signaling or group scheduling signaling sent by the scheduling device.

The processor 501 is further configured to determine, according to the dedicated signaling or the group scheduling signaling, that an LTE system in which the scheduling device is located is enabled, where the dedicated signaling or the group scheduling signaling is a physical downlink control channel PDCCH or a media access control layer controller MAC CE.

The UE 50 provided by the embodiment of the present invention is a device for executing an unlicensed spectrum scheduling method. For a specific process of executing the unlicensed spectrum scheduling method by the UE 50, reference may be made to the method embodiments shown in FIG. 1 to FIG. 4, and details are not described herein.

The embodiment of the present invention provides the UE. The UE monitors a status of a channel, and sends second channel status information on the channel if determining by means of monitoring that the channel is idle, where a frequency domain resource occupied by the channel is in an unlicensed spectrum, and a scheduling device is an eNB and/or an RRH. In this way, a scheduling device in LTE may monitor and reserve an unlicensed spectrum, so that LTE may support LBT and channel reservation. Based on this, UE is scheduled on a reserved channel that is in the unlicensed spectrum. After the scheduling device reserves the channel, another device in another system does not contend for or interfere with the channel. Therefore, it is ensured that the LTE system more properly shares the unlicensed spectrum with another device or another system.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An unlicensed spectrum scheduling method, comprising:

monitoring, by a scheduling device, a status of a channel;

when it is determined, according to the monitoring by the scheduling device, that the channel is idle, sending, by the scheduling device, a control frame on the channel to reserve the channel, wherein a frequency domain resource occupied by the channel is in an unlicensed spectrum, and the scheduling device is an evolved NodeB (eNB) and/or a remote radio head (RRH);

sending, by the scheduling device, first channel status information to user equipment (UE), wherein the first channel status information indicates that the scheduling device has reserved the channel;

sending, by the scheduling device, a radio resource control connection reconfiguration message to the UE; and receiving, by the scheduling device, second channel status information fed back by the UE, and determining, according to the second channel status information, whether to schedule the UE, wherein the second channel status information is generated by the UE according to a monitored status of the channel;

wherein the radio resource control connection reconfiguration message comprises parameter information and a feedback manner of the second channel status information, and the parameter information is determined by the scheduling device and used by the UE to sense the channel; and wherein the radio resource control connection reconfiguration message further comprises first reservation information and second reservation information, the first reservation information indicates that the scheduling device has determined, according to the monitoring by the scheduling device, that the UE needs to reserve the channel, and the second reservation information indicates that the scheduling device has determined that the UE has reserved the channel using a first clear to send (CTS) frame or a first request to send (RTS) frame.

2. The scheduling method according to claim 1, wherein the sending a control frame on the channel to reserve the channel comprises:
sending a second RTS frame or a second CTS frame on the channel to reserve the channel.

3. The scheduling method according to claim 2, wherein the second CTS frame is a clear to send to self (CTS-to-self) frame, and a receiving address of the CTS-to-self frame is a sending address.

4. The scheduling method according to claim 1, wherein the first CTS frame is a clear to send to self (CTS-to-self) frame, and a receiving address of the CTS-to-self frame is a sending address.

5. An unlicensed spectrum scheduling method, comprising:
monitoring, by user equipment (UE), a status of a channel;
generating second channel status information according to the channel status obtained by the monitoring by the UE;
receiving, by the UE, a radio resource control connection reconfiguration message sent by a scheduling device;
receiving, by the UE, first channel status information sent by the scheduling device, wherein the first channel status information indicates that the scheduling device has reserved the channel, wherein a frequency domain resource occupied by the channel is in an unlicensed spectrum, and the scheduling device is an evolved NodeB (eNB) and/or a remote radio head (RRH); and
feeding back, by the UE, the second channel status information to the scheduling device, causing the scheduling device to determine, according to the second channel status information, whether to schedule the UE;
wherein the radio resource control connection reconfiguration message comprises parameter information and a feedback manner of the second channel status information, and the parameter information is determined by the scheduling device and used by the UE to sense the channel; and
wherein the radio resource control connection reconfiguration message further comprises first reservation information and second reservation information, the first reservation information indicates that the scheduling device has determined that the UE needs to reserve the channel, and the second reservation information indicates that the scheduling device has determined that the UE has reserved the channel using a clear to send (CTS) frame or a request to send (RTS) frame.

6. The scheduling method according to claim 5, wherein the CTS frame is a clear to send to self (CTS-to-self) frame, and a receiving address of the CTS-to-self frame is a sending address.

7. An unlicensed spectrum scheduling device, wherein the scheduling device is an evolved NodeB (eNB) and/or a remote radio head (RRH), comprising:
a processor, configured to:
monitor a status of a channel;
when it is determined according to the monitoring that the channel is idle, enable a transmitter to send a control frame on the channel to reserve the channel, wherein a frequency domain resource occupied by the channel is in an unlicensed spectrum;
the transmitter, configured to send first channel status information to user equipment (UE) and to send a radio resource control connection reconfiguration message to the UE, wherein the first channel status information indicates that the scheduling device has reserved the channel, the radio resource control connection reconfiguration message comprises parameter information and a feedback manner of second channel status information, and the parameter information is determined by the scheduling device and used by the UE to sense the channel; and
a receiver, configured to receive the second channel status information fed back by the UE;
wherein the processor is further configured to determine, according to the second channel status information, whether to schedule the UE, wherein the second channel status information is generated by the UE according to a monitored status of the channel; and
wherein the radio resource control connection reconfiguration message further comprises first reservation information and second reservation information, the first reservation information indicates that the scheduling device has determined, according to the monitoring by the scheduling device, that the UE needs to reserve the channel, and the second reservation information indicates that the scheduling device has determined that the UE has reserved the channel using a first clear to send (CTS) frame or a first request to send (RTS) frame.

8. The scheduling device according to claim 7, wherein:
the transmitter is specifically configured to send a a second RTS frame or a second CTS frame on the channel to reserve the channel.

9. The scheduling device according to claim 8, wherein the second CTS frame is a clear to send to self (CTS-to-self) frame, and a receiving address of the CTS-to-self frame is a sending address.

10. The scheduling device according to claim 7, wherein:
the first RTS frame or the first CTS frame further comprises a field that indicates a radio access technology to which the control frame belongs, and the field indicates that the channel is occupied by the radio access technology.

11. The scheduling device according to claim 7, wherein the first CTS frame is a clear to send to self (CTS-to-self) frame, and a receiving address of the CTS-to-self frame is a sending address.

12. The scheduling device according to claim 7, wherein:
the first RTS frame or the first CTS frame further comprises a field that indicates a radio access technology to which the control frame belongs, and the field indicates that the channel is occupied by the radio access technology.

13. User equipment (UE), comprising:
a transmitter;
a processor, configured to monitor a channel status of a channel, and generate a second channel status information according to the channel status obtained by the monitoring; and
a receiver, configured to receive first channel status information sent by a scheduling device, and to receive a radio resource control connection reconfiguration message sent by the scheduling device;
wherein the first channel status information indicates that the scheduling device has reserved the channel, a frequency domain resource occupied by the channel is in an unlicensed spectrum, and the scheduling device is an evolved NodeB (eNB) and/or a remote radio head (RRH);

wherein the radio resource control connection reconfiguration message comprises parameter information and a feedback manner of the second channel status information, and the parameter information is determined by the scheduling device and used by the UE to sense the channel;

wherein the radio resource control connection reconfiguration message further comprises first reservation information and second reservation information, the first reservation information indicates that the scheduling device has determined, according to the monitoring, that the UE needs to reserve the channel, and the second reservation information indicates that the scheduling device has determined that the UE has reserved the channel using a first clear to send (CTS) frame or a first request to send (RTS) frame; and wherein the transmitter is configured to feed back the second channel status information to the scheduling device, causing the scheduling device to determine, according to the second channel status information, whether to schedule the UE.

14. The UE according to claim 13, wherein:

the second reservation information in the radio resource control connection reconfiguration message further indicates information about a maximum power, and the maximum power is a value determined by the eNB and required for sending a second CTS frame or a second RTS frame by the UE.

15. The UE according to claim 13, wherein the first CTS frame is a clear to send to self (CTS-to-self) frame, and a receiving address of the CTS-to-self frame is a sending address.

16. The UE according to claim 13, wherein:

the first RTS frame or the first CTS frame further comprises a field that indicates a radio access technology to which the first RTS frame or the first CTS frame belongs, and the field is used to indicate that the channel is occupied by the radio access technology.

* * * * *